US009119221B2

(12) United States Patent
Skog

(10) Patent No.: US 9,119,221 B2
(45) Date of Patent: *Aug. 25, 2015

(54) METHOD AND ARRANGEMENT FOR PROVIDING INFORMATION ON MULTIMEDIA OPTIONS

(75) Inventor: Robert Skog, Hässelby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 174 days.

This patent is subject to a terminal disclaimer.

(21) Appl. No.: 13/608,526

(22) Filed: Sep. 10, 2012

(65) Prior Publication Data

US 2013/0003625 A1    Jan. 3, 2013

Related U.S. Application Data

(63) Continuation of application No. 11/721,644, filed as application No. PCT/SE2004/001951 on Dec. 21, 2004, now Pat. No. 8,307,102.

(51) Int. Cl.
*H04W 4/14* (2009.01)
*H04W 88/02* (2009.01)

(52) U.S. Cl.
CPC .................... *H04W 88/02* (2013.01)

(58) Field of Classification Search
CPC .................................................. H04W 88/02
USPC ........................................................ 370/310
See application file for complete search history.

(56) References Cited

U.S. PATENT DOCUMENTS

| 7,366,183 | B1* | 4/2008 | Sylvain .................... 370/395.61 |
| 2003/0039237 | A1 | 2/2003 | Forslow |
| 2003/0236892 | A1 | 12/2003 | Coulombe |
| 2004/0008669 | A1 | 1/2004 | Bos et al. |
| 2004/0184439 | A1* | 9/2004 | Blanc et al. .................... 370/349 |
| 2005/0265265 | A1 | 12/2005 | Akama |
| 2006/0025149 | A1* | 2/2006 | Karaoguz et al. .......... 455/452.2 |
| 2007/0191056 | A1 | 8/2007 | Karaoguz et al. |

FOREIGN PATENT DOCUMENTS

| WO | WO 01/76165 A1 | 10/2001 |
| WO | WO 03/055193 A1 | 7/2003 |
| WO | WO 2006/052176 A1 | 5/2006 |

OTHER PUBLICATIONS

Rosenberg, et al.: "SIP: Session Initiation Protocol". Network Working Group, Request for Comments: 3261. Jun. 2002.

* cited by examiner

*Primary Examiner* — Peter Shaw

(57) ABSTRACT

A method and arrangement for providing updated information on the availability of multimedia options to terminal users. A first terminal (A) is initially engaged in a voice call with a second terminal (B) by using a first access admitting simultaneous multimedia communication. At least one available multimedia option is indicated based on capabilities of the first and second terminals. A change of connection is then detected from the first access to a second access not admitting simultaneous multimedia communication. In response thereto, a multimedia disabling notification is sent to the second terminal, and said at least one multimedia option is indicated as being no longer available. Preferably, the multimedia disabling notification is sent as an SMS message.

24 Claims, 3 Drawing Sheets

METHOD AND ARRANGEMENT FOR PROVIDING INFORMATION ON MULTIMEDIA OPTIONS

CROSS-REFERENCE TO RELATED APPLICATIONS

This application is a continuation of U.S. application Ser. No. 11/721,644, filed Aug. 20, 2007, now U.S. Pat. No. 8,307, 102, which was the National Stage of International Application No. PCT/SE04/01951, filed Dec. 21, 2004, the disclosures of which are incorporated herein by reference.

TECHNICAL FIELD

The present invention relates generally to a method and apparatus for providing information on the availability of multimedia options during a communication session. In particular, the invention provides accurate indication of options to convey multimedia content such as video, images, text, etc, from one terminal to another.

BACKGROUND OF THE INVENTION AND PRIOR ART

Until recently, wireless mobile terminals have been used basically for making voice calls. Standardised and well-established communication technologies and protocols are then utilised to communicate voice between fixed and/or mobile terminals using circuit-switched communication channels. However, a multitude of new multimedia telephony services are now rapidly being developed, enabled by the introduction of new technologies allowing for notably higher transmission rates and increased network capacity. For example, GPRS (General Packet Radio Service) and WCDMA (Wideband Code Division Multiple Access) technologies are currently emerging for enabling wireless telephony services requiring a wide range of transmission rates and different protocols and media formats.

Further, new sophisticated mobile terminals are also emerging on the market, equipped with functionality to handle the new services, including high resolution colour displays and various codecs (coders/decoders) e.g. for handling visual information.

The trend today in the field of telecommunication is a move towards packet-switched networks and technologies using the packet-based Internet Protocol (IP), providing more capacity and flexibility as compared to the traditional circuit-switched networks. Recently, a network architecture called "IP Multimedia Subsystem" (IMS) has therefore been developed by the $3^{rd}$ Generation Partnership Project (3GPP) as an open standard, to give operators of access networks the ability to offer multimedia services in the packet domain. IMS is a platform for enabling services based on IP transport, more or less independent of the access technology used, which is basically not restricted to any limited set of specific services.

Multimedia services typically involve the transmission of different types of content such as text, documents, images, video and audio files or "clips" in various formats and combinations. The term "multimedia" will be used in this description to represent telephony services requiring the transfer of any choice of content, in addition to ordinary voice. Multimedia communication sessions typically involve combinational services with voice and other media at the same time.

It has been proposed that a multimedia session should be divided into a circuit-switched (CS) part for the voice transport, and a packet-switched (PS) part for the transport of other data in combinational services. In this way, the high performance associated with circuit-switching is obtained for voice, whereas not equally delay-sensitive multimedia content can be adequately transferred by packet-switching. New access networks typically allow for simultaneous CS and PS communication, such as WCDMA networks and GSM networks having DTM (Double Transfer Mode) capability.

During a session between two terminals, certain session parameters defining the rules of communication must be used by both terminals in order to send and receive any desired information. Such session parameters may be related to available codecs, applications and multiplexing schemes. Two communicating terminals may have different capabilities with respect to the above, and each terminal has initially no knowledge of the capabilities of the other. Hence, in order to establish a multimedia session, session parameters that both terminals can handle must therefore first be selected and determined by exchanging capabilities.

A specification for session setup has been defined called "SIP" (Session Initiation Protocol, according to the standard IETF RFC 3261 et al). SIP is an application-layer control (signalling) protocol for creating, modifying and terminating sessions over a packet-switched logic. In SIP, a method called "INVITE" is defined to initiate a session during a setup procedure when the terminals basically exchange their capabilities.

Another method called "OPTIONS" is also specified in the SIP protocol allowing one terminal to query another terminal as to its capabilities regarding codecs and supported applications, without the user actually "calling" the other party. According to this method, the terminal sends a capability query called "SIP OPTIONS", preferably includes its own capabilities, to the other terminal which then responds by sending over its capabilities. A "SIP OPTIONS update" message can also be sent if they are changed. In this way, both terminals will become aware of each other's capabilities. The OPTIONS method can also be used during an ongoing voice call for enriching the call with multimedia, provided that both access networks allow for packet-switched communication in addition to the currently ongoing circuit-switched communication.

By having knowledge of the other terminal's capabilities, each terminal can determine which multimedia service and/or application options that are available to their users, hereafter called "multimedia options" for short, based on their mutual capabilities. A highly desirable feature is that terminal users should be able to see on the terminal screen which multimedia options are currently available. Thus, after exchanging capabilities each terminal may indicate the available multimedia options to their users on the terminal screen. Most commonly, associated icons are then displayed but any other indication means may be used as well, such as other symbols, codes, texts, menu lists, etc. In this way, a user can easily select which type of service and media to use in a multimedia session with the other party.

For example, a multimedia option may be indicated as being available by the mere presence of an associated symbol, icon, text or list entry on the terminal screen, or by highlighting a displayed option by means of a specific colour, light intensity, size, etc. An unavailable option may be indicated by having a different colour, e.g. grey, light intensity or size, or by being crossed-over, or simply by being deleted from the screen. Thus, it is clearly understood that the availability and non-availability of multimedia options can be indicated in many different ways, and the present invention is not limited in this respect. In this description, the term "option indication" will represent any possible manner of indication.

When two terminals are engaged in a simple CS voice call, one of them (or both) may currently experience access constraints, such that a PS connection is not admitted in addition to the ongoing CS call depending on limitations in the access network. For example, a standard GSM network cannot handle PS connections and CS connections at the same time, although it may admit a PS connection separately. Some networks, including older GSM networks, may lack PS capability altogether admitting CS connections only. Further, one and the same network may comprise certain geographic coverage areas admitting multimedia communication, e.g. specific non-constrained cells, and also other coverage areas not admitting multimedia communication, e.g. constrained cells.

Modern terminals typically have the dual capability of executing a PS session simultaneously with a CS call in order to provide combinational services. Furthermore, there are known mechanisms for a terminal to change its radio access during an ongoing call, e.g. by moving from one coverage area into another one. For example, some terminals are capable of both GSM access and WCDMA access by having dual radio parts.

Two terminals A and B may initially be prevented from establishing a multimedia session, due to access constraints for at least one terminal A having dual access capability. Terminal A may later, during the ongoing call, obtain a new access allowing for an added PS part, e.g. by changing from a standard GSM access to a WCDMA access or to a GSM/DTM access. When moving in the opposite direction, the terminals will experience disablement of previously available multimedia options. Thus, when a communicating mobile terminal move between different types of access networks, the prerequisites for multimedia communication may consequently change. This is a fact even if the other terminal is connected to an access network allowing for multimedia communication with simultaneous CS and PS connections.

The International Patent Application PCT/SE2004/001671, filed Nov. 15, 2004, discloses a solution for enabling multimedia communication during an ongoing circuit-switched call. First, a mobile terminal uses an access having constraints by not admitting simultaneous PS and CS communication. A change of connection is detected to another access admitting simultaneous PS and CS communication, and the terminals exchange capabilities in response to the connection change. Then, possible multimedia options may be indicated to the users, e.g. on the terminal screens.

If the feature of displaying available multimedia options on terminal screens is used in at least one of two communicating terminals, it is a problem that the displayed options may become irrelevant as soon as any change of access occurs for either of the terminals, due to constraints in the new access. Thus, it is desirable to increase the accuracy of this feature.

SUMMARY OF THE INVENTION

It is an object of the present invention to provide a solution for displaying available multimedia options on terminal screens with great accuracy during a multimedia communication session involving at least one mobile terminal. It is another object of the present invention to update the displayed options in response to a change of access for the mobile terminal.

These objects and others are obtained by a method and apparatus for providing updated information on the availability of multimedia options to terminal users. A first terminal having a display screen is initially engaged in a voice call with a second terminal by using a first access admitting simultaneous multimedia communication. At least one available multimedia option is first indicated on the screen based on capabilities of the first and second terminals. When a change of connection is detected from the first access to a second access not admitting simultaneous multimedia communication, e.g. by the first terminal moving into a different coverage area, a multimedia disabling notification is sent over the second access to the second terminal in response to detecting the connection change. It is then indicated on the screen that said at least one multimedia option is no longer available.

The first access may involve connection with a first access network allowing packet-switched and circuit-switched communication simultaneously, and the second access may involve connection to a second access network not allowing packet-switched and circuit-switched communication simultaneously. The at least one multimedia option may involve the communication of content including at least one of: a video clip, an audio clip, a text, an image and a game.

The multimedia disabling notification is preferably sent as an SMS message, but may also be sent as a USSD (Unstructured Supplementary Service Data) message, or by means of user-to-user signalling. If SMS is used, the SMS message may comprise a standard SIP OPTIONS update message, or a specific binary code that the second terminal can recognise.

A multimedia option may be indicated as available by displaying an associated symbol, icon, text or menu entry on the terminal screen, or by highlighting a displayed option by means of a specific colour, light intensity or size. Further, when the at least one multimedia option becomes unavailable, it may be indicated accordingly by having a different colour, light intensity or size, or by being crossed-over, or by being deleted from the screen.

If a change of connection is later detected from the second access to a third access admitting simultaneous multimedia communication, e.g. by the first terminal moving into another coverage area, a multimedia enabling notification is sent over the third access to the second terminal. It is then indicated on the screen that said at least one multimedia option has become available again. The multimedia enabling notification may likewise be sent as an SMS message, or USSD message, or by means of user-to-user signalling.

The present invention further encompasses a mobile terminal adapted to provide updated information on the availability of multimedia options to a terminal user. The invented mobile terminal comprises means for being initially engaged in a voice call with another terminal by using a first access admitting simultaneous multimedia communication, and means for indicating at least one available multimedia option based on capabilities of said terminals. The mobile terminal further comprises means for detecting a change of connection from the first access to a second access not admitting simultaneous multimedia communication, means for sending a multimedia disabling notification over the second access to the other terminal in response to detecting said change of connection, and means for indicating that said at least one multimedia option is no longer available.

As in the above-defined method, the first access may involve connection with a first access network allowing packet-switched and circuit-switched communication simultaneously, and the second access may involve connection to a second access network not allowing packet-switched and circuit-switched communication simultaneously. Further, said at least one multimedia option may involve the communication of content including at least one of: a video clip, an audio clip, a text, an image and a game.

The invented mobile terminal may be further adapted to send the multimedia disabling notification as an SMS message, or USSD message, or by means of user-to-user signalling. The mobile terminal may be further adapted to include a standard SIP OPTIONS update message in the SMS message, or a binary code in the SMS message that the other terminal can recognise.

The mobile terminal may be further adapted to indicate a multimedia option as available by displaying an associated symbol, icon, text or menu entry on the terminal screen, or by highlighting a displayed option by means of a specific colour, light intensity or size. The mobile terminal may be further adapted to indicate that the at least one multimedia option has become unavailable by means of a different colour, light intensity or size, or by being crossed-over, or by deleting it from the screen.

The mobile terminal may be further adapted to detect a change of connection from the second access to a third access admitting simultaneous multimedia communication, send a multimedia enabling notification over the third access to the other terminal, and indicate on the screen that said at least one multimedia option is available again. The mobile terminal may be further adapted to send the multimedia enabling notification as an SMS message, or USSD message, or by means of user-to-user signalling.

Further features and benefits of the present invention will be apparent from the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 1:
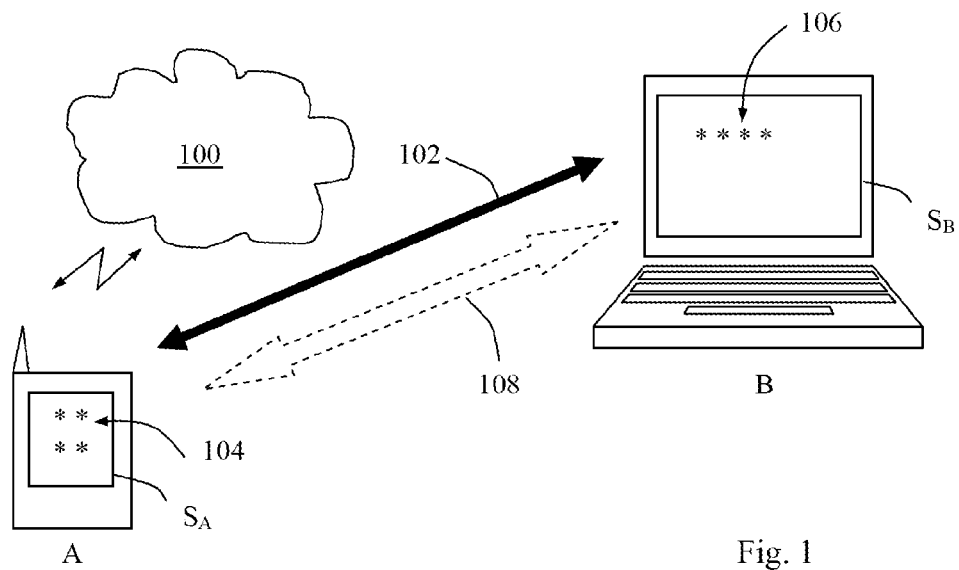
FIG. 1 is a schematic view of a basic communication scenario where the present solution may be used.

FIG. 1 illustrates schematically a basic communication scenario between a mobile terminal A and another terminal B, where the present solution may be used. Terminal B may be a mobile terminal, a wireless PC, or any other communication unit, and both terminals are capable of multimedia communication involving combinational services. Terminal A is currently in radio connection with a mobile access network 100, and each terminal A, B is equipped with a viewing screen $S_A$ and $S_B$, respectively, for displaying multimedia options, e.g. in the form of icons or the equivalent, as well as any received visual content. Of course, further communication networks (not shown) may be involved in the communication between A and B, and it is assumed that these terminals and networks are capable of using conventional communication techniques and protocols which are not necessary to described here.

In FIG. 1, terminals A and B are engaged in a voice call 102, and the used networks, i.e. network 100 and others, allow for multimedia communication and combinational services. It is assumed that the terminals have previously exchanged their capabilities which are thus mutually known, e.g. as described above. Accordingly, the multimedia options available within the capabilities of both terminals are indicated on the screens $S_A$ and $S_B$, as schematically illustrated at 104 and 106, respectively. This indication of options may be done in any manner, as discussed above. Hence, the users are free to activate any desirable application corresponding to an indicated available option, e.g. by clicking the associated indication on the screen, in order to execute a multimedia session 108 involving the transfer of multimedia content.

Figure 2:
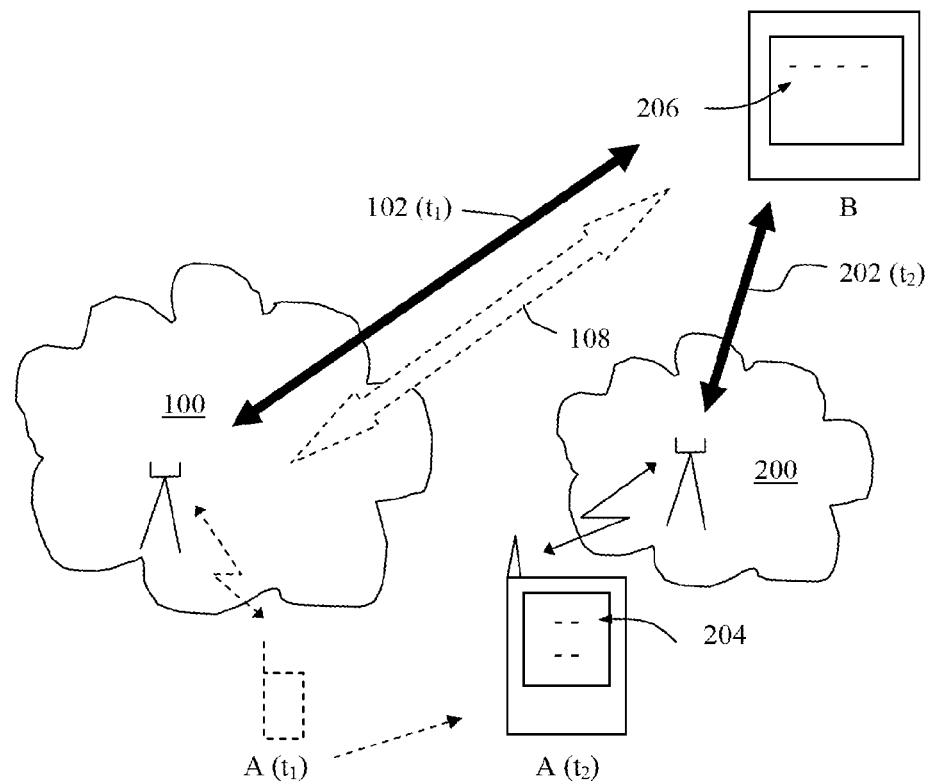
FIG. 2 is a schematic view of a communication scenario where a mobile terminal A moves from one access network to another.

An exemplary procedure in accordance with the present invention for providing information on the availability of multimedia options on the screens $S_A$ and $S_B$ of terminals A and B, respectively, will now be described with further reference to the communication scenario in FIG. 2, which is a continuation of the scenario in FIG. 1. The reference numbers used in FIG. 1 will be used again for the same details in FIG. 2. Thus, the starting point for this procedure is an ongoing call 102 when available multimedia options 104, 106 are indicated on the screens of A and B.

During a first time period $t_1$ of the call 102, terminal A is connected to a base station of a first access network 100 allowing for multimedia communication with terminal B, as indicated with arrow 108. In this context, it does not matter whether the terminals actually utilise any such option by executing a session 108 or not.

At some point during the call, terminal A moves away from the first network 100 and towards a second access network 200 not allowing for multimedia communication in this situation. For example, network 200 may not allow for combinational services with simultaneous PS and CS communication, or may lack PS capability altogether admitting CS communication only. Network 100 may use WCDMA technology or GSM/DTM technology, whereas the new network 200 may use traditional GSM technology. A similar situation could also occur within the same network if terminal A moves out of a non-restricted coverage area and into a restricted coverage area, e.g. between different cells in the same network, and the present solution is applicable also in this case. Thus, networks 100 and 200 generally represent areas of different accesses with respect to multimedia.

In the present case, terminal A is equipped with dual radio parts and can therefore change its access from network 100 to the new network 200, even if they use different radio technologies. In order to do that, conventional intersystem handover procedures may be used, which are not necessary to describe here further to understand the present solution. Thus, terminal A now becomes connected to access network 200, and the circuit-switched voice connection between terminals A and B is still continued over network 200 during a second time period $t_2$, as indicated by arrow $202(t_2)$.

However, since terminal A now experiences access constraints in network 200, it has become impossible to enrich the ongoing voice call by introducing multimedia in combinational services. Normally, this change of access is conducted without being noticed by any of the terminal users. Therefore, the user of terminal A, as well as the user of terminal B, will not be aware of this sudden loss of multimedia options, unless they are notified in some way.

According to the present solution, terminal A is adapted to automatically send a "multimedia disabling notification" to terminal B in response to detecting a change of access not allowing for multimedia, in this case access to the new access network 200. As terminal B receives the multimedia disabling notification, it becomes aware that the previously available multimedia options are no longer available.

Moreover, both terminals can now change their indication of options 104 and 106 by indicating the options as unavailable instead, which is illustrated in the figure at 204 and 206, respectively, in response to the access change of terminal A. As mentioned above, the indication whether multimedia options are available or not can be made in any suitable manner, and the present invention is not limited in this respect. In this way, each user of terminal A and B will immediately be aware of the new communication restrictions by viewing his/her terminal screen.

According to a preferred embodiment, the multimedia disabling notification is a standard SMS (Short Messaging Service) message that the receiving terminal B can recognise. According to one alternative, the above-described "SIP OPTIONS update" message may be included in the SMS, substituting a regular SIP OPTIONS update message over IP, since this has become impossible to convey over the new access. However, the SMS may basically be any binary code that B can recognise, not necessarily being intelligible to humans, but may also be a specific alphanumeric combination. According to other alternatives, the multimedia disabling notification may be sent as a USSD (Unstructured Supplementary Service Data) message, or by means of "user-to-user signalling" directly between the terminals embedded in the established voice channel or in a suitable control channel, e.g. according to the standard 3GPP TS 23.087.

Figure 3:
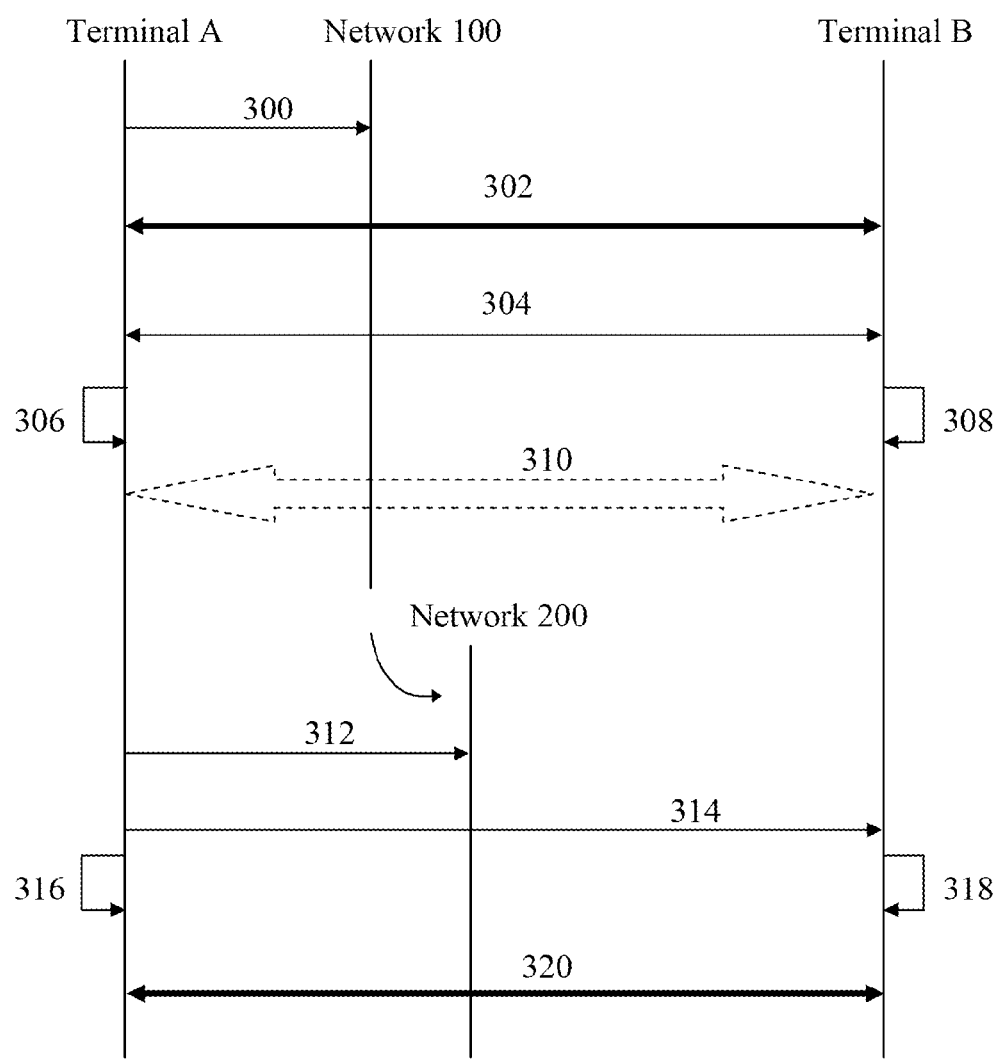
FIG. 3 is a signalling diagram illustrating a procedure for providing information on the availability of multimedia options on terminal screens, in accordance with the present invention.

With reference to a signalling diagram illustrated in FIG. 3, an exemplary signalling procedure will now be described for executing the inventive method basically according to the scenario of FIG. 2. The diagram thus includes the mobile terminals A and B, the first access network 100 having no access constraints, and the second network 200 having access constraints. The access network used by terminal B is not shown, but it is assumed that terminal B does not experience any such access constraints in this context. It should be noted that the mobile terminals A and B could be any communication units capable of simultaneous PS and CS communication.

In a first step 300, terminal A gains access with the first network 100, e.g. when powered on. A next step 302 illustrates that a circuit-switched voice call between terminals A and B is established. It does not matter which one of A and B is the calling party and called party, respectively.

In a step 304, the terminals A and B exchange their capabilities according to any standard procedure, e.g. using a SIP OPTIONS message, in order to determine any available multimedia options during this call. Next, these are indicated on the screen of terminal A in a step 306 and on the screen of terminal B in a step 308. It should be noted that any number of multimedia options may be displayed depending on the terminal capabilities, and the present invention is not limited in this respect. The terminal users are now free to activate any application offered by the indicated available options, e.g. by clicking a selected option indication on the screen, to enrich the ongoing voice call by introducing multimedia in a parallel session 108, as indicated in an optional step 310.

At some point later during the call, terminal A performs an intersystem handover to the second access network 200, in a next step 312. Since network 200 imposes access constraints to terminal A by not allowing for combinational services with multimedia communication, the indicated available options are no longer relevant. Therefore, in accordance with the present solution, terminal A sends the above-described multimedia disabling notification in a step 314 that terminal B will recognise, preferably as a specific SMS message, or USSD message, or by means of user-to-user signalling.

As both terminals are now aware of the disablement of multimedia, the options are indicated as being unavailable on the screen of terminal A in a step 316 and on the screen of terminal B in a step 318. As mentioned above, this can also be done in different ways, for example by changing colour (e.g. to grey), light intensity or size, or by being crossed-over, or simply by being deleted from the screen. In any case, the terminal users can now easily see that the options are no longer available, and the availability indication will always be up-to-date. At the same time, the voice call may continue over network 200 in a final step 320, without being affected by the above-described activities.

Figure 4:
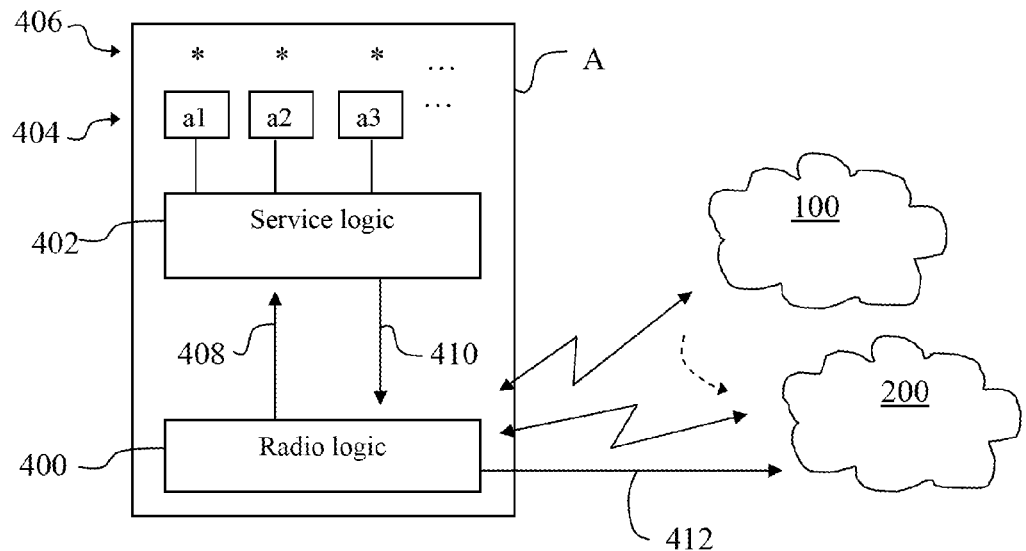
FIG. 4 is a schematic block diagram of a mobile terminal changing its access from one network to another.

A possible procedure of detecting the above-described change of access by terminal A will now be described in more detail with reference to FIG. 4, which is a schematic block diagram of the logic structure of terminal A. In terminal A, specific logics are implemented for handling the radio functions and service functions, as represented by logic units 400 and 402, respectively. In this case, radio logic 400 is capable of handling radio access with both networks 100, 200. Each logic 400, 402 comprises a protocol stack according to the prevailing standards, not described here further. Of course, there are other logic systems (not shown) implemented as well in the terminal for other functions, which are not relevant to describe here.

Above the service logic 402, a series of applications a1, a2, a3 . . . are installed in order to enable various services, as controlled by the service logic 402. For example, one application a1 may be used for playing a video file in a specific format using a corresponding codec, whereas another application a2 may be used for displaying a picture in a specific format, as received from the other terminal B, using another suitable codec, etc. Each application a1, a2, a3 . . . may be associated with an option indication 406 on the terminal screen, and the indication of available options implies that the corresponding applications can be activated by the user.

When terminal A makes an intersystem handover from network 100 to network 200, the radio logic 400 notifies the service logic 402 by means of an internal message 408. The service logic 402 then orders the radio logic 400, by means of an internal message 408, to send the above-described multimedia disabling notification towards terminal B. Then, the multimedia disabling notification 412 is issued accordingly from the radio logic 400 over the new network 200, corresponding to step 314 above.

Figure 5:
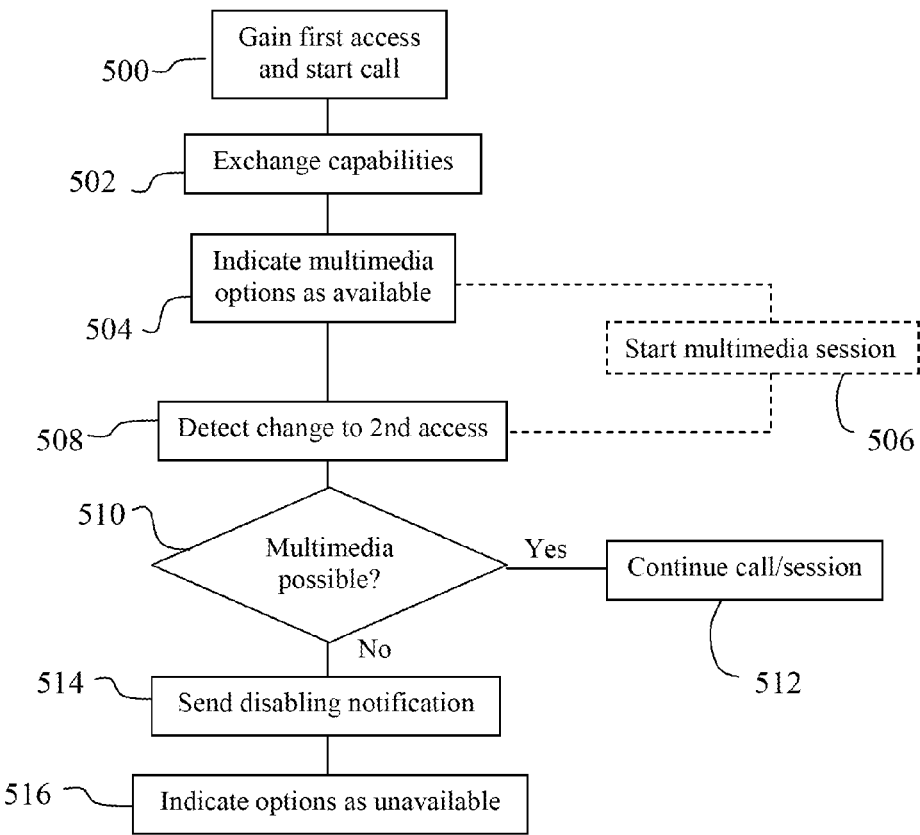
FIG. 5 is a flow chart illustrating a basic procedure for providing information on the availability of multimedia options, according to the invention.

Referring to a flow chart in FIG. 5, a basic procedure of providing information on multimedia options according to the present solution will now be described. This procedure is executed in a mobile terminal, such as terminal A shown in FIGS. 1, 2 and 4. In a first step 500, the mobile terminal gains a first access, e.g. with network 100 above, and starts a voice call with another terminal using said first access. The first access allows for multimedia communication, e.g. by means of simultaneous PS and CS communications.

In a next step 502, the mobile terminal exchange capabilities with the other terminal in order to determine any available multimedia options during the call. Next, the available options are indicated on the screen of the mobile terminal in a step 504, which also can be indicated on the screen of the other terminal as well. Thereby, the terminal users can select any of the available options and execute a multimedia session, as indicated by an optional step 506.

At some point later during the call, a change from the first access to a second access is detected in a next step 508, e.g. by making an intersystem handover as described above. Thereafter in step 506, it is determined whether the new access allows for multimedia communication by admitting packet-switched communication simultaneously with the ongoing voice call. If so, the voice call and multimedia session can continue without further action, according to step 512. However, if the second access does not admit a multimedia session, the mobile terminal automatically sends a multimedia disabling notification to the other terminal, as indicated in a step 514.

Next, the options are indicated as unavailable on the screen of the mobile terminal in a step 516, which also can be indicated on the screen of the other terminal as well. Thereby, the availability of multimedia options will be automatically updated on the screens. Alternatively, the detected change of access in step 508 may be a new access obtained within the same first network, e.g. by making handover from one non-constrained cell to another constrained one not admitting multimedia communication.

If the mobile terminal later gains a new access allowing for multimedia communication, e.g. by returning into coverage of the first network 100 in FIG. 2, the multimedia options can be indicated as available again. Thus, if terminal A generally gains a third access allowing for multimedia communication during the still ongoing voice call, terminal A may send to terminal B a new "multimedia enabling notification" over the new access that terminal B will recognise. This message may likewise be sent preferably as a specific SMS message, or USSD message, or by means of user-to-user signalling. Also, the options can then be indicated as available again on the screens of the mobile terminals. In this case, no terminal capabilities need to be exchanged again, but the same options as before can be indicated, assuming that the terminals have not changed in this respect. Alternatively, the terminal capabilities can be exchanged once again, e.g. according to the mechanism disclosed in PCT/SE2004/001671, which however lies outside the scope of the present invention.

It should be noted that the existing SMS mechanism in particular is quite suitable for conveying the above-described multimedia disabling and enabling notifications between terminals, regardless of whether the current access allows for multimedia or not. Thus, the SMS functionality should be regarded as an available means for communicating the notifications over any of the first, second and third accesses in the described embodiments.

The present invention will thus provide the terminal users with updated information on the availability of multimedia options, even if one of the terminals change access during an ongoing voice call. Thereby, the feature of displaying such options on the terminal screen will be enhanced by increased reliability.

While the invention has been described with reference to specific exemplary embodiments, the description is in general only intended to illustrate the inventive concept and should not be taken as limiting the scope of the invention, which is defined by the appended claims.

The invention claimed is:

1. A method of providing updated information on the availability of multimedia options to terminal users, said method comprising:
wherein a first terminal having a display screen is initially engaged in a voice call connection with a second terminal by using a first radio access wherein
said first radio access supporting simultaneous multimedia communication for said first terminal, and
at least one multimedia option supported by said simultaneous multimedia communication, said at least one multimedia option supported by said simultaneous multimedia communication is available when using said first radio access, is indicated on the display screen based on capabilities of the first and second terminals,
detecting, by said first terminal, a connection change from the first radio access to a second radio access for providing said voice call connection,
detecting, by said first terminal, that said second radio access cannot support at least one multimedia option,
sending, from said first terminal to said second terminal, a multimedia disabling notification over the second radio access to the second terminal in response to said detecting step, wherein the display screen of said first terminal indicates that said at least one multimedia option is no longer available from said second radio access, wherein the multimedia disabling notification is generated by the first terminal so that when received by the second terminal it instructs a display screen of said second terminal to indicate that said at least one multimedia option is no longer available from said second radio access.

2. The method according to claim 1, wherein the first radio access involves connection with a first access network allowing packet-switched and circuit-switched communication simultaneously, and the second radio access involves connection to a second access network not allowing packet-switched and circuit-switched communication simultaneously.

3. The method according to claim 1, wherein said at least one multimedia option involves the communication of content including at least one of: a video clip, an audio clip, a text, an image and a game.

4. The method according to claim 1, wherein the multimedia disabling notification is sent as a Short Message Service (SMS) message, or an Unstructured Supplementary Service Data (USSD) message, or by means of user-to-user signaling.

5. The method according to claim 4, wherein the SMS message comprises a standard Session Initiated Protocol (SIP) OPTIONS update message.

6. The method according to claim 4, wherein the SMS message comprises a binary code recognizable by the second terminal.

7. The method according to claim 1, wherein said at least multimedia option is indicated on the display screen as available by displaying an associated symbol, icon, text or menu entry on the terminal screen, or by highlighting a displayed option by means of a specific color, light intensity or size.

8. The method according to claim 7, wherein in said indicating step, said at least one multimedia option is indicated on the display screen as unavailable by having a different color, light intensity or size, or by being crossed-over, or by being deleted from the display screen.

9. The method according to claim 1, wherein, if a change of connection is detected from the second radio access to a third radio access wherein said third radio access is capable of supporting simultaneous multimedia communication, a multimedia enabling notification is sent by the first terminal over the third radio access to the second terminal, wherein the display screen indicates that said at least one multimedia option is available again.

10. The method according to claim 9, wherein the multimedia enabling notification is sent as a Short Message Service (SMS) message, or an Unstructured Supplementary Service Data (USSD) message, or by means of user-to-user signaling.

11. The method according to claim 1, wherein the first terminal sends the multimedia disabling notification to the second terminal regardless of whether or not the first terminal and the second terminal are actually utilizing any of the at least one multimedia option supported by the first radio access.

12. A mobile terminal adapted to provide updated information on the availability of multimedia options to a terminal user, the mobile terminal comprising:
    means for being initially engaged in a voice call connection with another terminal over a first radio access wherein said first radio access supporting simultaneous multimedia communication for said mobile terminal;
    a display screen for indicating, based on capabilities of said mobile terminal and the another terminal, at least one multimedia option available when using said first radio access;
    means for detecting a change of connection from the first radio access to a second radio access for providing said voice call connection;
    means for detecting that said second radio access is not capable of supporting at least one multimedia option;
    means for sending a multimedia disabling notification over the second access to the another terminal in response to detecting said change of connection, wherein the multimedia disabling notification is from said mobile terminal to said another terminal; and
    wherein the display screen indicates that said at least one multimedia option is no longer available from said second radio access, and wherein the multimedia disabling notification is generated by the mobile terminal so that when received by the another terminal it instructs a display screen of the another terminal to indicate that said at least one multimedia option is no longer available from said second radio access.

13. The mobile terminal according to claim 12, wherein the first radio access involves connection with a first access network allowing packet-switched and circuit-switched communication simultaneously, and the second radio access involves connection to a second access network not allowing packet-switched and circuit-switched communication simultaneously.

14. The mobile terminal according to claim 12, wherein said at least one multimedia option involves the communication of content including at least one of: a video clip, an audio clip, a text, an image and a game.

15. The mobile terminal according to claim 12, wherein the mobile terminal is further adapted to send the multimedia disabling notification as a Short Message Service (SMS) message, or an Unstructured Supplementary Service Data (USSD) message, or by means of user-to-user signaling.

16. The mobile terminal according to claim 15, wherein the mobile terminal is further adapted to include a standard Session Initiated Protocol (SIP) OPTIONS update message in the SMS message.

17. The mobile terminal according to claim 15, wherein the mobile terminal is further adapted to include a binary code in the SMS message that is recognizable by the another terminal.

18. The mobile terminal according to claim 12, wherein the mobile terminal is further adapted to indicate on the display screen that the at least one multimedia option as available by displaying an associated symbol, icon, text or menu entry on the terminal screen, or by highlighting a displayed option by means of a specific color, light intensity or size.

19. The mobile terminal according to claim 18, wherein the mobile terminal is further adapted to indicate on the display screen that said at least one multimedia option has become unavailable by means of a different color, light intensity or size, or by being crossed-over, or by deleting it from the display screen.

20. The mobile terminal according to claim 12, wherein the mobile terminal is further adapted to detect a change of connection from the second radio access to a third radio access, wherein said third radio access is capable of supporting said simultaneous multimedia communication, send a multimedia enabling notification over the third radio access to the another terminal, and indicate on the display screen that said at least one multimedia option is available again.

21. The mobile terminal according to claim 20, wherein the mobile terminal is further adapted to send the multimedia enabling notification as a Short Message Service (SMS) message, or an Unstructured Supplementary Service Data (USSD) message, or by means of user-to-user signaling.

22. The mobile terminal according to claim 12, wherein the sending means sends the multimedia disabling notification to the another terminal regardless of whether or not the mobile terminal and the another terminal are actually utilizing any of the at least one multimedia option supported by the first radio access.

23. A mobile terminal adapted to provide updated information on the availability of multimedia options to a terminal user, comprising:
    a display screen;
    at least one processor; and,
    at least one memory that stores processor-executable instructions, wherein the at least one processor interfaces with the at least one memory to execute the processor-executable instructions, whereby said mobile terminal is operable to:
        initially engage in a voice call connection with another terminal over a first radio access wherein said first radio access supporting simultaneous multimedia communication for said mobile terminal;
        indicate on the display screen at least one multimedia option available when using said first radio access based on capabilities of said mobile terminal and the another terminal;
        detect a change of connection from the first radio access to a second radio access for providing said voice call connection;
        detect that said second radio access is not capable of supporting at least one multimedia option;
        send a multimedia disabling notification over the second access to the another terminal in response to detecting said change of connection, wherein the multimedia disabling notification is sent from said mobile terminal to said another terminal, wherein the multimedia disabling notification is generated by the mobile terminal so that when received by the another terminal it instructs a display screen of the another terminal to indicate that at least one multimedia option is no longer available from said second radio access; and,
        indicate on the display screen that said at least one multimedia option is no longer available from said second radio access.

24. The mobile terminal according to claim 23, wherein the mobile terminal sends the multimedia disabling notification to the another terminal regardless of whether or not the mobile terminal and the another terminal are actually utilizing any of the at least one multimedia option supported by the first radio access.

* * * * *